June 6, 1939.    H. H. BIGLEY    2,161,126
APPARATUS FOR PHOTOGRAPHY AND PROJECTION
Filed Sept. 16, 1935    2 Sheets-Sheet 1
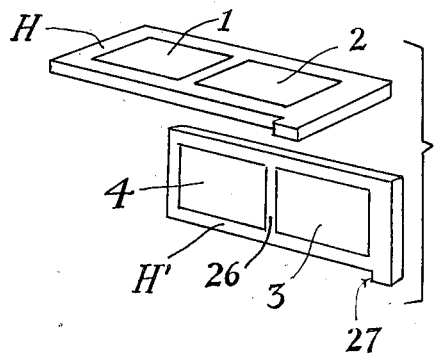
Fig. 2.
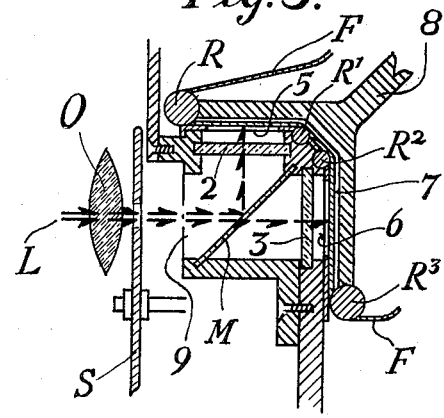
Fig. 3.
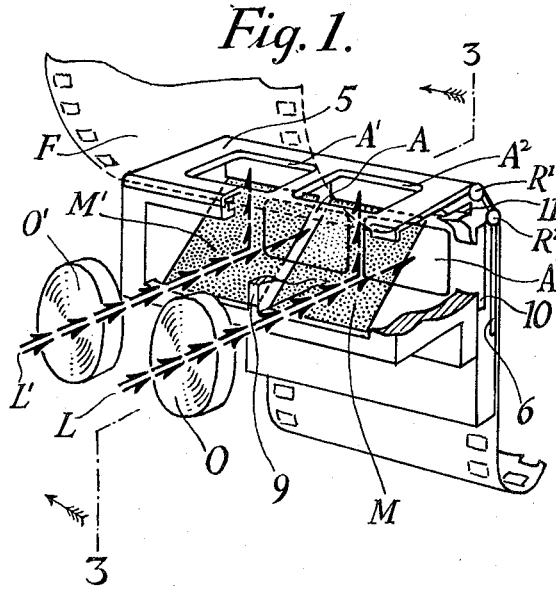
Fig. 1.
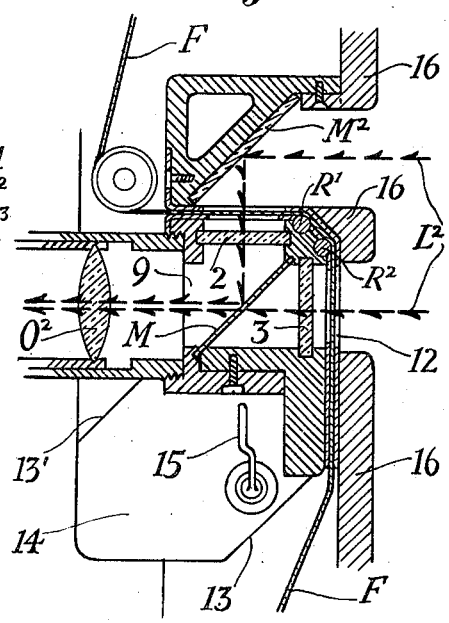
Fig. 4.
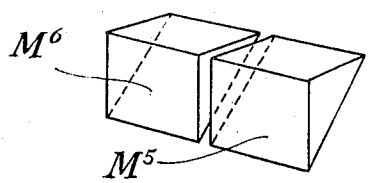
Fig. 1ª.
INVENTOR.
Harold H. Bigley
BY
ATTORNEY.

June 6, 1939. H. H. BIGLEY 2,161,126
APPARATUS FOR PHOTOGRAPHY AND PROJECTION
Filed Sept. 16, 1935    2 Sheets-Sheet 2
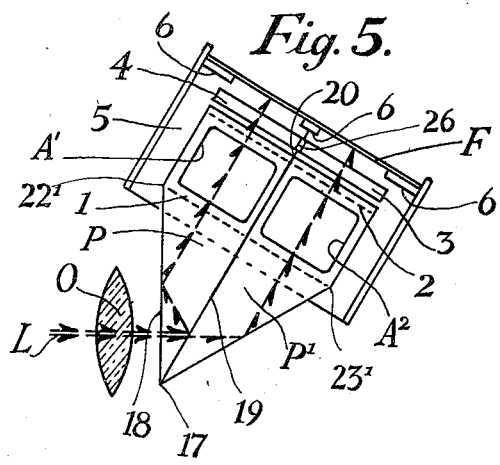
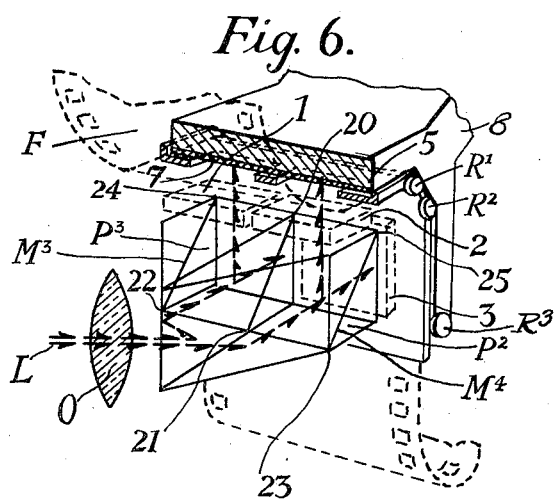
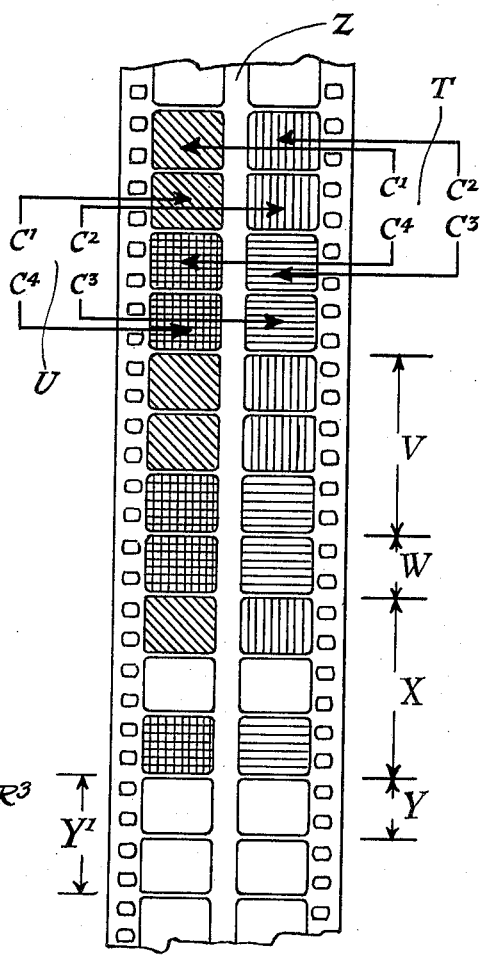
Harold H. Bigley INVENTOR.
BY
ATTORNEY.

Patented June 6, 1939

2,161,126

UNITED STATES PATENT OFFICE 2,161,126

APPARATUS FOR PHOTOGRAPHY AND PROJECTION

Harold H. Bigley, Chatham, N. J., assignor of twenty-five percent to James N. Catlow, New York, N. Y.

Application September 16, 1935, Serial No. 40,723

4 Claims. (Cl. 88—16.4)

What is commonly known as white light is really made up of many combined colors. From the standpoint of motion pictures in color, however, we may consider white light as composed of only a red, a green, and a blue element. From these three major color sensations all the other colors are produced.

Cameras and methods have been successfully developed for making series of complementary color records on either the same or separate films for cinematography. The most practical of these has been chiefly for what is known as two-color combinations; and the more elaborate has been by the imbibition (dye-absorption) principle, whereby records of component colors are secured on mono, bi-packs, and tri-packs. These methods, so far devised, are disposed to be too intense and vivid in their results. They give the feeling of being too highly colored, sometimes to the point of fatiguing the beholder. This is due to a loss of what is known as the basic value or tone, the advantages and disadvantages of these systems being well known to those skilled in the art of making motion pictures. Two color systems give what is known as fringes. The three-color imbibition process, by which the best results in color photography have been obtained, is both an elaborate and an expensive process, requiring considerable dexterity in its later stages, and in expense and manipulation is far beyond the reach of the usual amateur, who has to date been compelled to use a specially prepared film. Furthermore, this special film will stand only a limited amount of magnification due to the exhibition of the lines or grains embodied in the emulsion, by reason of which it is impossible to make satisfactory duplicates.

The object of the present invention is to overcome the above difficulties and objections. My invention relates to improvements in color photography and projection, and furnishes a system whereby four separate and distinct component color records of the same object may simultaneously be secured on one panchromatic film. The invention comprises an optical arrangement which records in black and white the images of component colors contained within an object being photographed, which, when projected through a device somewhat similar to that by which it is taken, will reproduce pictures of the object in full natural colors.

Principal objects of my invention are the following: First, to provide a system making it possible to take motion pictures in black and white which, with proper apparatus can be projected in their original colors or, projected as a black and white picture; second, to provide a method and apparatus for producing simultaneously four component color records of the same object on one film or emulsion; third, to expose simultaneously four component color records of the same object which will register two on the horizontal and two on the vertical positions of the film; fourth, to enable a colored picture to be magnified any desired size on a screen without former difficulties; fifth, to cause projection to be made either by a one-lens system or a two-lens system for the above objects; sixth, to make possible a method which is more expeditious and considerably cheaper than present day methods; seventh, to position the filters so as to insure best results in the utilization of direct light and reflected light which are used in my system. Other and further objects of my invention will be apparent in the accompanying drawings, wherein, like characters denote like, or corresponding parts throughout the several views and in which:—

Figure 1 is a detailed view in perspective of a two-lens system; which may be either a camera or a projector;

Figure 1a is a perspective view of a pair of prisms which may be used as an alternative for the mirrors shown in Figure 1;

Figure 2 is a perspective view of the color filter assembly used in photographing and projecting according to my system;

Figure 3 is a vertical section of the camera unit on the line 3—3 of Figure 1 including also additional camera parts;

Figure 4 is a vertical section of the projector unit on line 3—3 of Figure 1, including additional projector parts;

Figure 5 is a diagrammatic view of a one-lens system;

Figure 6 is a detailed view in perspective of Figure 5; and

Figure 7 indicates diagrammatically the cycle of film movement and position of component color frames.

Referring to Figure 1, O and O' represent an optical system of any suitable construction. A light splitting device in the character of mirrors is provided at M and M' respectively, comprising a partially reflecting surface and a partially transmitting surface, which device divides each of the main image-bearing beams of light L and L' into two divisions, making a total of four divisions, each of which divisions carries the same complete object in full. A septum 9, partially broken away, is provided, which divides the filter chamber into two separate compartments for the mirrors M and M' respectively. The top wall of this chamber consists of a horizontal front aperture plate 5, in which are located apertures A' and A2. A vertical front aperture plate 6 is provided in which are located apertures A and A3. Small rollers R' and R2 extend the full width of both aperture plates 5 and 6, and act as anti-friction bearings for the film F at these points. Vertical and horizontal slots 10 and 11 are provided for the purpose of inserting therein the filter holders H and H'.

In the filter holders H and H' Figure 2, are located the filters in which 1 represents green, 2 represents red, 3 represents blue, and 4 represents light yellow or light greenish yellow, the last named being of such density (commensurate with the type of film used) as to be adapted to give the correct rendition of all colors in their relative value to black and white. The filter holders H and H' are provided with stops 27, adapting the filter holders to be inserted in slots 10 and 11 the correct way only. The filter holder H is inserted in slot 11, and the filter holder H' in slot 10. It will be seen from this arrangement that the green and red filters occupy the horizontal position, while the blue and yellow filters occupy the vertical position. The purpose of this is to allow the green and red filters to receive the reflected light which is stronger than the transmitted light when passed through the mirrors M and M'. This arrangement utilizes to the best advantage the light passing through the respective filters, allowing the simultaneous exposures made through A, A', A2, and A3, tending to equalize the same by compensating for the different sensitivities of the various colors. A further advantage of my filter arrangement is, therefore, apparent in the fact that the blue, and the black and white aspects, are recorded in different light paths from the red and the green. It is a matter of common knowledge that both blue and black-and-white are more sensitive to light than the green or red aspects, a very desirable feature due to the fact that the blue and black-and-white receive the transmitted light, while the red and green receive the reflected light. The black-and-white relative color value record softens or tones down the harsh and saturated colors, by reason of the fact that light allowed to reach the screen when projected imbues or modifies the half tones and high lights of the various colors with correspondingly more light to key them to their correct values or relation with the darker parts.

The method of film travel through the camera in relation to the optical system is shown in Figure 3. 8 is a yoke preferably metal containing the rear aperture plate 7, and is moveable back and forth to allow film F to be passed under roller R, over roller R', over roller R2, and under roller R3. The position shown in Figure 3 illustrates the film threaded and ready for exposure. By means of shutter S, light from lens O is allowed to strike the mirror M which partially reflects and partially transmits light. The reflected light passes through filter 2, through aperture A2 in the horizontal front film plate 5 onto film F, giving the red aspect or record. The transmitted light passes through filter 3, through aperture A3 in the vertical front film plate 6 onto film F, giving the blue aspect or record. The said records are made simultaneously.

Refer now to Figure 7. Here is indicated diagrammatically the position of component color aspects exposed simultaneously, and the cycle of film movement. The various aspects are; C', green, C2 red, C3 blue, and C4 the relative color value (commonly called black-and-white). Group marked T is the result of one exposure. Now the film moves a distance sufficient to bring the group marked U, containing C', C2, C3, and C4, in front of apertures marked A, A', A2, and A3. Group marked U is the result of the second exposure. To bring unexposed film in front of apertures A, A', A2, and A3, for the third exposure, the film must travel a distance equal to the amount marked V. For the fourth exposure, it necessitates a film movement of the amount marked W. For the fifth exposure, the film movement is equal to that marked X, which is equivalent to the one marked V. The distance marked Y represents the film travel for the sixth exposure, and is of a like movement as the one marked W. It will be apparent from this that the film movement alternates between successive exposures a distance of one frame, and then three frames. Between alternate exposures film movement will be of a common nature. The distance marked Y' is equivalent to the amount of film consumed in what is now known as a "standard" frame. In other words, four pictures or records of the same object are taken on what is called a "standard" frame. So the film in its shorter movement represents only one-half the film consumption of present methods. During its longer movement the amount consumed is equivalent to that used for one and one-half "standard" frames.

The reason for alternate short and long movements of the film may be explained by reference to Figure 1. We will start with the assumption that no exposures have yet been taken. The film is in position for exposure. Exposures are then simultaneously made through the horizontal apertures A' and A2 and the vertical apertures A and A3. It will be seen that an area of unexposed film lies between these horizontal and vertical apertures. The next movement of the film is the short movement which will move the film a frame, and bring the unexposed area lying between the two areas just exposed to the vertical apertures A and A3, and at the same time bring an unexposed area of the film to the horizontal apertures A' and A2. Upon these latter two areas being exposed, it will be seen that the film has been exposed for a continuous line of four frames. Now in order to position an unexposed area of film in the vertical apertures A and A3, it is necessary to subject the film to the long movement, which will carry it three frames. This latter advance of the film brings the same to the corresponding position of the film as before the first exposure, and in a position to pass through the same cycle just described.

Upon analyzation it will be seen that four black and white pictures of the same object with color aspects are now taken in a space formerly occupied by one "standard" black and white picture. The amount of film consumed, therefore, is the same as for ordinary black and white motion picture film. It will be evident upon further observation that two adjacent green records and two adjacent black-and-white records alternate down one half of the film, and that two adjacent red and two adjacent blue records alternate down the other half of the film. This regular arrangement simplifies the splicing of the film, should a break occur, it being only necessary to bring two records of a like nature together. Z represents the sound track for sound recording purposes.

Obviously for projection of colored pictures, an apparatus somewhat similar to that used for exposing is needed (see Figure 4), the only differences being the provision of a projection lens O2, and a full silvered totally reflecting mirror M2 of a length equivalent to the width of the aperture plate 5. The mirror M2 being placed at an angle of forty-five degrees reflects the fullest amount of projector light L2 through the horizontal part of the rear aperture plate 12. Both horizontal and vertical portions of rear aperture plate 12 have openings that correspond to, but are slightly larger than, apertures A, A', A2, and A3. 16 represents the projector head. This head contains means for operating the film and also a shutter, which means and shutter do not form any part of my invention, and are therefore not illustrated in the drawings. A condenser of conventional form is used between the shutter and projector head 16. The means and shutter may be of any conventional form. The path of projector beam is shown by arrowed lines L2. 13 and 13' represent slides or grooves on which unit 14, including optical units, are moved by means of bringing the lever 15 into a horizontal position for the threading of the projector. The fact that identical units are used both for taking and projecting, the resultant records or complete picture is in absolute register when projected. For the projection of pictures in full color, filter holders of the type H and H', shown in Figure 2, are used with but one exception. In the space occupied by filter 4, in H', there is no filter, the opening being left clear. To project pictures in black-and-white, should it be desired, a solid slide may be provided in which there are no openings to be inserted in slot 11. In slot 10 a slide with only one opening is inserted adapted to register with aperture A. These slides block the light from the three color aspects or records, and permit projection only through the opening opposite aperture A.

In Figure 5 O represents an objective lens, P and P', a prism set with a light dividing surface between 17 and 19. This partially reflects and partially transmits the image-bearing beam of light L, which enters through the space between 17 and 18 of prism P. Surface 17 to 23' of prism P' is a full reflecting surface. 18 to 22' of prism P is a full reflecting surface also. The space 19 to 20 between P and P' is absolutely opaque, as is also the space between P2 and P3. 26 is a septum between filters 3 and 4. The transmitted image-bearing beam from surface 17 to 19 is fully reflected on surface 17 to 23' of prism P', in the direction of arrowed line L, to the rear surface of prism P' (see Figure 6). This surface M4, designated by the numbers 20, 21, 23 and 25, is of a half silvered light dividing nature. The image-bearing beam at this point is again divided into two component beams. The reflected beam passes through filter 2 to the film for the red aspect or record. The transmitted beam passes through filter 3 to the film for the blue aspect or record. Reflected image-bearing beam L from surface 17 to 19 is again reflected on surface 18 to 22' of prism P in the direction of arrowed line to the rear surface M3 of prism P, for the green and relative color value aspects. Surface M3, designated by the numerals 20, 21, 22, and 24, is of a half silvered light dividing nature similar to M4. From this point the image-bearing beam is also divided into two component beams. The reflected beam passes through filter 1 to the film for the green aspect or record, and the transmitted beam passes through filter 4 to the film for the relative color value aspect or record. P2 and P3 are small prisms merely to protect the delicately silvered surfaces of P and P'. Shutter, not shown, operates between O and P.

I have described what I believe to be the best embodiment of my invention. I do not wish to be limited in patent protection to the embodiment shown and described, however, but what I desire to cover by Letters Patent is set forth in the appended claims.

I claim:

1. In the art of cinematography, a unitary plate structure embodying a pair of plates angularly disposed to each other, said plates having exposure apertures therein, filters adapted to cover said apertures, means for holding said filters in said aperture plates, means adapted to split an image bearing beam of light into two horizontal beams, and means adapted to split each of said horizontal beams into a horizontal beam and a vertical beam and project the split beams selectively through said filters, means to support a film over said angularly disposed filters and adapt it to receive the split image bearing beams, anti-friction means carried by the aperture plate structure over which the film is adapted to pass, and a yoke cooperating with said aperture plate structure, to guide the film in its progress over said plates.

2. In the art of cinematography, a unitary plate structure embodying a pair of plates angularly disposed to each other, said plates having exposure apertures therein, filters adapted to cover said apertures, means for holding said filters in said aperture plates, means adapted to split an image bearing beam of light into two horizontal beams, and means adapted to split each of said horizontal beams into a horizontal beam and a vertical beam and project the split beams selectively through said filters, means to support a film over said angularly disposed filters and adapt it to receive the split image bearing beams, and a yoke cooperating with said aperture plate structure, to guide the film in its progress over said plates.

3. In the art of cinematography, a unitary plate structure embodying a pair of plates angularly disposed to each other, said plates having exposure apertures therein, filters adapted to cover said apertures, means for holding said filters in said aperture plates, means adapted to split an image bearing beam of light into two horizontal beams, and means adapted to split each of said horizontal beams into a horizontal beam and a vertical beam and project the split beams selectively through said filters, means to support a film over said angularly disposed filters and adapt it to receive the split image bearing beams.

4. The structure set forth in claim 3 in which the means adapted to split the image bearing beam consist of a set of four prisms divided centrally in a longitudinal manner and divided laterally in an oblique manner, the said longitudinal surfaces being partially light reflecting and transmitting and partially opaque and the oblique surfaces being light reflecting and transmitting, the outer sides of the prism set being light reflecting, except for a part thereof which is clear to receive the image bearing beam, the planes of the prism set being so disposed as to divide the beam of light into four parts and project one of such parts through each of the four respective filters onto the film.

HAROLD H. BIGLEY.